Patented Jan. 1, 1935

1,986,054

UNITED STATES PATENT OFFICE 1,986,054

METHOD OF COPYING FROM LENTICULAR SCREEN FILMS ONTO COLORED MATERIAL

Béla Gaspar, Berlin, Germany

No Drawing. Application July 15, 1932, Serial No. 622,814. In Germany July 29, 1931

2 Claims. (Cl. 95—2)

This invention relates to a method of copying from lenticular screen films on to colored material composed of a plurality of layers.

According to the British Patent 343,369 dated April 3, 1929, it is already known to accomplish photographic three-color pictures by means of lenticular screen films. In accordance with this patent it is known to copy lenticular screen films on to sensitized emulsions, which are poured one upon the other and are sensitive to different colors.

Heretofore it has not been practicable to copy these lenticular screen films on to a plurality of layers sensitive to different colors wherein the dye has been incorporated in the layer, as the superimposed different colored layers absorb the effective light for the greater part, and these layers appear to be colored almost black even when held against the light.

In a separate patent I have described a method, in which several layers sensitive to different colors and provided with an intense color are in intimate connection on a layer. If these layers are exposed behind suitable, colored master images, the dye after developing will be destroyed at the point of the silver image, or also the point free of silver. The superimposed intensely colored layers do not allow visible bright light to pass. For this reason the light employed for copying purposes is so chosen that even the undermost layer may be exposed. This may be accomplished by making the undermost layer sensitive to infra-red, and employing therefor an infra-red light capable of passing through all part layers.

According to the invention, the following arrangement is employed, and this constitutes a preferred form of embodiment of the invention:

The first, i. e., the uppermost layer is colored yellow and is sensitive to green, the second purple-red and sensitive to red, and the third blue-green and sensitive to infra-red. In this arrangement the natural sensitiveness of each layer, in comparison with the arrangements hitherto known, which are described as monopack or tripack, is displaced to the extent of one-third of the spectrum towards the infra-red end thereof. For copying purposes there is employed a lenticular screen exposure—a negative or diapositive—in which the selection filters are displaced towards the red end of the spectrum. The blue filter sector for the exposure is upon copying replaced for example by a green filter sector, which is impervious to infra-red, the green filter sector by a filter sector which is pervious to red but not infra-red, and the red filter sector by a sector pervious to infra-red of approximately 680µ upwards.

The sequence of the colored layers set forth in the above example may naturally be varied as desired, as explained in a separate patent. The undermost layer may, for example, be purple red, followed by yellow and blue-green layers. In this case the undermost layer is made sensitive to infra-red, for example approximately 680µ upwards, and the green filter sector is replaced by one allowing the passage of infra-red. The remaining filter sectors are replaced by filters adapted to the sensitiveness of the colored layers and their spectral perviousness.

For example—the red filter is replaced by a blue filter, and the blue filter by a red-orange filter. The last two filters must be impervious to infra-red. The essential point is that the particular sector of the exposure filter, to which there is assigned the part image of the undermost layer, may be replaced by a filter pervious to infra-red. Naturally, this process may also be adapted to two colored layers.

The method described is suitable for producing both kinematograph as well as paper pictures.

According to the invention, an additional convenient form for adapting the exposure to any irregular sensitiveness of the single part layers is arrived at as follows:

The part layers are not exposed simultaneously through all filter sectors, but a part is on each occasion covered, and the single part layers may be exposed for different lengths of time with the particular light assigned to the same. The procedure, however, may also be such that in the first place exposure is made simultaneously through all filter sectors, and then additional exposure made through a filter sector with a particular kind of light. This is preferably quantitative determined in the known manner on a testing strip by the use of a copying photometer.

What I claim as new and desire to secure by Letters Patent is:

1. A method of producing color-photographic copies on a plurality of superimposed differently colored and differently sensitized layers, one of which being sensitized to infra-red from lenticular screen images; which consists in replacing upon copying, the sectors of the ordinary exposure filter by filters, of which the one intended for the undermost infra-red sensitized layer allows the passage of infra-red, approximately 680µ upwards, while the other two filters are each colored in a desired primary color, which is adapted to the spectral transmission of the colored copying layers.

2. A method according to claim 1, in which the copying is performed in chronological succession through the single filter sectors, and exposure is made for different lengths of time through the single sectors in accordance with the sensitiveness of the single part layers.

BÉLA GASPAR.